United States Patent
Balus et al.

(10) Patent No.: US 9,832,097 B2
(45) Date of Patent: *Nov. 28, 2017

(54) METHOD AND APPARATUS FOR MPLS LABEL ALLOCATION FOR A BGP MAC-VPN

(71) Applicant: Alcatel Lucent, Boulogne, Billancourt (FR)

(72) Inventors: Florin Balus, Cupertino, CA (US); Wim Henderickx, Westerlo (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,068

(22) Filed: Jun. 13, 2014

(65) Prior Publication Data

US 2014/0294004 A1   Oct. 2, 2014

Related U.S. Application Data

(63) Continuation of application No. 13/110,309, filed on May 18, 2011, now Pat. No. 8,767,731.

(60) Provisional application No. 61/346,434, filed on May 19, 2010.

(51) Int. Cl.
| | |
|---|---|
| *H04L 12/701* | (2013.01) |
| *H04L 12/46* | (2006.01) |
| *H04L 12/715* | (2013.01) |
| *H04L 12/723* | (2013.01) |

(52) U.S. Cl.
CPC .......... *H04L 45/00* (2013.01); *H04L 12/4641* (2013.01); *H04L 45/04* (2013.01); *H04L 45/507* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 6,041,057 A * | 3/2000 | Stone | ............................ 370/397 |
| 7,564,803 B1 | 7/2009 | Minei et al. | |
| 7,577,143 B1 | 8/2009 | Kompella | |
| 7,623,446 B1 | 11/2009 | Allan et al. | |
| 7,940,698 B1 | 5/2011 | Minei et al. | |
| 2003/0031192 A1 | 2/2003 | Furuno | |
| 2004/0125805 A1 | 7/2004 | De Clercq | |
| 2009/0175274 A1 | 7/2009 | Aggarwal et al. | |
| 2009/0296713 A1 | 12/2009 | Kompella | |
| 2011/0032945 A1 | 2/2011 | Mullooly et al. | |

OTHER PUBLICATIONS

Aggarwal et al., "BGP MPLS Based Ethernet VPN", Mar. 14, 2011, IETF.*

(Continued)

*Primary Examiner* — Peter Chau
(74) *Attorney, Agent, or Firm* — Tong, Rea, Bentley & Kim, LLC

(57) ABSTRACT

The invention includes a method and apparatus for distributing flooding labels within a Multiprotocol Label Switching (MPLS) infrastructure supporting Border Gateway Protocol (BGP) Media Access Control (MAC) Virtual Private Networking (VPN).

12 Claims, 7 Drawing Sheets

(56) References Cited

OTHER PUBLICATIONS

The International Search Report and the Written Opinion of the International Searching Authority, or the Declaration, dated Jul. 6, 2011, in PCT/US2001/037099, Alcatel-Lucent Usa Inc., Applicant, 11 pages.
Le Faucheur et al., "Advertising IPv4 Network Layer Reachability Information with an IPv6 Next Hop," RFC 5549, May 2009.
Kompella et al., "Virtual Private LAN Service (VPLS) Using BGP for Auto-Discovery and Signaling," RFC 4761, Jan. 2007.
Aggarwal et al., "Multicast in VPLS," Network Working Group, Internet Draft, Jun. 2, 2008.
Kompella et al., "Multi-homing in BGP-based Virtual Private LAN Service," Network Working Group, Internet-Draft, Nov. 3, 2008.
Aggarwal et al., "BGP MPLS Based MAC VPN," Network Working Group, Internet Draft, Mar. 26, 2010.
Aggarwal, R. et al. "BGP MPLS Based MAC VPN," Network Working Group Internet Draft, Version 01, Jun. 2, 2010, pp. 1-31.

\* cited by examiner

METHOD AND APPARATUS FOR MPLS LABEL ALLOCATION FOR A BGP MAC-VPN

CROSS REFERENCE TO RELATED APPLICATIONS

This application is a continuation of U.S. patent application Ser. No. 13/110,309, filed on May 18, 2011, now U.S. Pat. No. 8,767,731, which application claims priority to U.S. Provisional Patent Application Ser. No. 61/346,434, filed on May 19, 2010, entitled MPLS LABEL DISTRIBUTION SCHEME FOR BGP MAC-VPNs. Both prior patent applications are hereby incorporated herein by reference.

FIELD OF THE INVENTION

The invention relates to the field of communication networks and, more specifically, to multi-protocol label switching (MPLS) networks.

BACKGROUND OF THE INVENTION

Multiprotocol Label Switching (MPLS) enables efficient delivery of a wide variety of differentiated, end-to-end services. MPLS supports delivery of such services using label switched paths (LSPs). Depending on different factors, hundreds or even thousands of LSPs may be provisioned in a given MPLS network. As network conditions change, LSPs provisioned in a given MPLS network often need to be changed.

Border Gateway Protocol (BGP) Media Access Control (MAC) Virtual Private Networking (VPN) supports BGP-based distribution of MAC addresses in a Virtual Private LAN Service (VPLS).

Unfortunately, there is no operable solution to the problem of providing BGP MAC-VPN within the context of infrastructure based on MPLS labels due to, illustratively, the lack of an operable mechanism or procedure for label allocation.

SUMMARY OF THE INVENTION

Various deficiencies in the prior art are addressed through the invention of a method and apparatus for allocating labels within an MPLS infrastructure supporting BGP MAC-VPN.

One embodiment is a method for distributing flooding labels within a Multiprotocol Label Switching (MPLS) infrastructure supporting Border Gateway Protocol (BGP) Media Access Control (MAC) Virtual Private Networking (VPN), wherein the method comprises generating, at destination provider edge (PE) routers, a generic flooding label (GFL) for each MAC-VPN Instance (MVI) that is advertising; generating, at destination PE routers, a Multi-Homing Flooding Label (MHFLx) for each designated forwarder (DF) Ethernet Segment Identifier (ESI) that is advertising; and distributing, toward source PE routers, each generated GFL and MHFLx label using MAC-VPN Network Layer Reachability Information (NLRI) including a Route-Distinguisher (RD) and an ESI.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention will be primarily depicted and described herein within the context of a Multiprotocol Label Switching (MPLS) infrastructure supporting Border Gateway Protocol (BGP) Media Access Control (MAC) Virtual Private Networking (VPN). The described BGP MAC-VPN provides BGP-based distribution of MAC addresses in a Virtual Private LAN Service (VPLS) Forwarding Information Base (FIB), thereby eliminating MAC learning and flooding over the Multiprotocol Label Switching (MPLS) core. Further, the system is capable of providing Multipath or Active/Active Access Resiliency for a Layer 2 Multipoint-to-Multipoint VPN service.

A label allocation scheme provided herein to address various challenges, including (1) Packet Duplication, such as where remote customer edge (or customer equipment) CE receives two copies of the same packet; (2) Loop Prevention, such as where a packet originated by a specific CE is returned to that specific CE; (3) MAC table instability, such as where a MAC M1 appears alternatively at destination CEs on different links, thereby creating re-ordering issues & MAC table instability.

Figure 1:
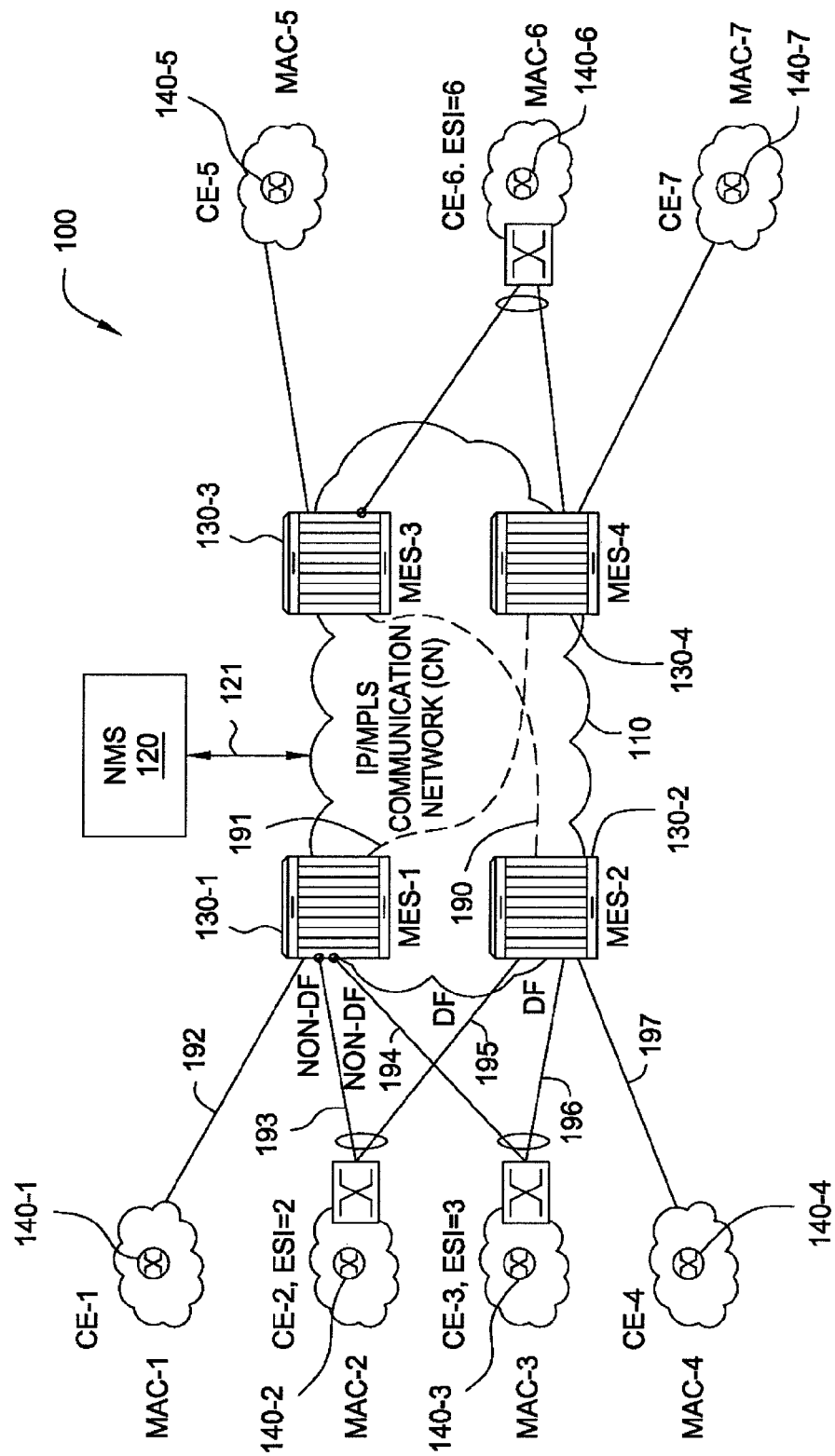
FIG. 1 depicts a high-level block diagram of a communication network architecture.

FIG. 1 depicts a high-level block diagram of a communication network architecture according to one embodiment. Specifically, the architecture 100 of FIG. 1 provides a Border Gateway Protocol (BGP) Multi-Protocol Label Switching (MPLS) network (BGP MPLS network) supporting Media Access Control (MAC) Virtual Private Networking (VPN) or MAC-VPN.

The architecture 100 includes an IP/MPLS communication network (CN) 110, a network management system (NMS) 120, a plurality of provider edge (PE) routers (or MPLS Edge Switches (MES)) 130-1 through 130-4 (collectively PE routers 130) and a plurality of customer edge (CE) routers 140-1 through 140-7 (collectively CE routers 140).

The PE routers 130 are connected together by a full mesh of MPLS label switched path (LSP) tunnels implemented via numerous routers or switching elements (not shown) within the MPLS infrastructure of CN 110.

Each of the various CE routers 140-1 through 140-7 is associated with a respective media access control (MAC) and is connected to one or more PE routers 130. For example, in the illustrative embodiment of FIG. 1, PE router 130-1 is connected to CE routers 140-1 through 140-3, PE router 130-2 is connected to CE routers 140-2 through 140-4, PE router 130-3 is connected to CE routers 140-5 and 140-6, and PE router 130-4 is connected to CE routers 140-6 and 140-7. It will be appreciated that more or fewer CE routers 140 may be connected to the various PE routers 130, and that the specific combinations/connections are provided herein for illustrative purposes only.

Data packets or datagrams are routed according to ingress and egress virtual connection (VC) labels on a per-service basis. The VC labels are used by the PE routers 130 for demultiplexing traffic arriving from different services over the same set of LSP tunnels.

PE routers learn the source media access control (MAC) addresses of the traffic arriving on their access and network ports. Each PE router 130 maintains a forwarding information base (FIB) for each VPLS service instance, and learned MAC addresses are populated in the FIB table of the service. All traffic is switched based on MAC addresses and forwarded between all participating PE routers using the LSP tunnels.

Unknown packets (that is, packets where the destination MAC address has not been learned) are forwarded on all LSPs to the participating PE routers for that service (i.e., flooded to the PE routers) until an appropriate destination or target station responds such that the MAC address is learned by the PE routers associated with that service.

The NMS 120 is a network management system adapted for performing the various management functions described herein. The NMS 120 is adapted to communicate with nodes of CN 110. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 110 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments.

Several paths are specifically referenced in FIG. 1 for simplifying the discussion with respect to the operation of the various embodiments. Specifically, a path 190 communicates data between MES-2 (130-2) and the network 110, a path 191 communicates data between MES-1 (130-1) and the network 110, a path 192 communicates data between MES-1 (130-1) and CE-1 (140-1), a path 193 communicates data between MES-1 (130-1) and CE-2 (130-2), a path 194 communicates data between MES-1 (130-1) and CE-3 (130-3), a path 195 communicates data between MES-2 (130-2) and CE-2 (130-2), a path 196 communicates data between MES-2 (130-2) and CE-3 (130-3), and a path 197 communicates data between MES-2 (130-2) and CE-4 (130-4). Other paths exist as shown in FIG. 1.

BGP MPLS Based MAC-VPN

The above described communication network implements a Border Gateway Protocol (BGP) Multi-Protocol Label Switching (MPLS) network (BGP MPLS network) supporting Media Access Control (MAC) Virtual Private Networking (VPN) or MAC-VPN. Various implementation details will now be described.

As previously noted, the MAC-VPN network comprises CEs that are connected to PEs or MPLS Edge Switches (MESs) disposed at the edge of an MPLS infrastructure. A CE may be a host, a router or a switch. The MPLS Edge Switches provide Layer 2 virtual bridge connectivity between the CEs. There may be multiple MAC-VPNs in the provider's network. The instance of a MAC-VPN on an MES is referred to as a MAC-VPN Instance (MVI). The MESs are connected by a MPLS LSP infrastructure.

MAC Learning Through Control Pane

Learning between MESs occurs in the control plane, specifically the BGP control plane. This control plane learning advantageously enables load balancing, allows CEs to connect to multiple active points of attachment, and improves convergence times in the event of certain network failures. Learning between MESs and CEs occurs in the data plane, such as according to IEEE 802.1x, 802.1aq, LLDP, or other protocols.

The Layer 2 forwarding table on a MES may contain all the MAC destinations known to the control plane or a subset of the known MAC destinations selected using a cache based scheme. For instance, the forwarding table of a specific MES may be populated only with the MAC destinations of the active flows transiting the specific MES.

The policy attributes of a MAC-VPN are similar to those of an IP VPN. A MAC-VPN instance requires a Route-Distinguisher (RD), and a MAC-VPN requires one or more Route-Targets (RTs). A CE attaches to a MAC-VPN on a MES in a particular MVI on a VLAN or simply an Ethernet interface. When the point of attachment is a VLAN there may be one or more VLANs in a particular MAC-VPN. Some deployment scenarios guarantee uniqueness of VLANs across MAC-VPNs: all points of attachment of a given MAC-VPN use the same VLAN, and no other MAC-VPN uses this VLAN. This is referred to as a "Single VLAN MAC-VPN."

Ethernet Segment Identifier

If a CE is multi-homed to two or more MESs, the set of attachment circuits constitutes an Ethernet segment. An Ethernet segment may appear to the CE as a Link Aggregation Group. Ethernet segments have an identifier denoted as the Ethernet Segment Identifier (ESI). A single-homed CE is considered to be attached to a Ethernet segment with ESI 0; otherwise, an Ethernet segment has a unique nonzero ESI.

The ESI can be assigned using various mechanisms: (1) the ESI may be configured; (2) if Link Aggregation Control Protocol (LACP) is used between the MESs and CEs that are hosts, then the ESI may be determined by LACP; (3) if Link Label Distribution Protocol (LLDP) is used between the MESs and CEs that are hosts, then the ESI may be determined by LLDP; and (4) in the case of indirectly connected hosts and a bridged LAN between the hosts and the MESs, the ESI is determined based on the Layer 2 bridge protocol, where the value of the ESI is derived by listening to BPDUs on the Ethernet segment (the MES learns the Switch ID, MSTP ID and Root Bridge ID by listening to BPDUs).

Determining Reachability to Unicast MAC Addresses

MESs forward packets that they receive based on the destination MAC address. Thus, the MESs must be able to learn how to reach a given destination unicast MAC address. There are two components to MAC address learning, "local learning" and "remote learning."

Local Learning is where a particular MES learns MAC addresses of the CEs that are connected to it. That is, the MESs in a particular MAC-VPN support local data plane learning from connected CEs via standard Ethernet learning procedures. The MES learns MAC addresses in the data plane when it receives packets from the CE network such DHCP requests, gratuitous ARP requests for its own MAC, ARP request for a peer and the like. Alternatively, if a CE is a host then MESs may learn the MAC addresses of the host in the control plane using extensions to protocols such as LLDP that run between the MES and the hosts. In the case where a CE is a host or a switched network connected to hosts, the MAC addresses is reachable via a given MES may move such that it becomes reachable via another MES. This is referred to as a MAC Move.

Remote learning is where a particular MES learns MAC addresses of the remote CEs; namely, CEs that are "behind" or connected via other MESs, or CEs or hosts that are "behind" or connected via remote CEs. Remote learning of MAC addresses is performed in the control plane. In order to achieve remote learning, each MES advertises in the control plane the MAC addresses it learns from its locally attached CEs.

MES Control Plane Advertisement

Control plane advertisement by each MES of its learned MAC addresses is provided to other MESs in the MAC-VPN using an extension of BGP. Specifically, BGP is extended to advertise these MAC addresses using a Network Layer Reachability Information (NLRI) denoted as MAC-VPN-NLRI. This extension includes for MAC-VPN a new Address Family Identifier (AFI) and a new Subsequent Address Family Identifier (SAFI).

The MAC-VPN-NLRI encodes a number of information elements or fields when used for BGP MAC VPN, such as the Route Type (RT), Length field and Value field.

The Route Type (RT) used to identify the format of the following value field. A number of route type code points may be defined. The Length field used to indicate the length in octets of the following Value field. The Value field—carries information specific to each individual RT.

For the purpose of this discussion the following RTs will be used, though other RTs may also be used:
  (a) Ethernet tag Auto-discovery—allows for Designated Forwarder (DF) election and load balancing functions. May be used for fast MAC Withdraw;
  (b) MAC Advertisement—used for MAC address advertisement between MESes;
  (c) Inclusive Multicast VLAN—provides a mechanism to indicate that a certain packet was flooded at the source MES. Usually the BUM traffic (BUM=Broadcast, Unknown Unicast, Multicast) traffic is flooded at ingress MES. This ensures only one copy of a flooded packet is delivered to a Multi-homed (MH) CE as only the DF is forwarding the packets marked flooded to the MH CE; and/or
  (d) Ethernet Segment Route—provides for loop avoidance; incoming traffic from the MH CE on the non-DF Attachment Circuit is tagged with a label specific to the MH ESI. At the receiving MES that contains the DF for that MH ESI the tag is used to block the packet from being forwarded back to the same MH CE.

An exemplary structure for the NLRI carrying the MAC Advertisement RT will now be discussed. The structure includes the following:
  (1) The Route-Distinguisher (RD) of the MAC-VPN instance that is advertising the NLRI. Specifically, a unique RD is assigned for each MAC-VPN instance on a MES, such as by using a Type 1 RD. The value field may comprise an IP address of the MES (such as the loopback address) followed by a number unique to the MES. This number may be generated by the MES or it may be all or a portion of the VLAN ID (e.g., such as for the Single VLAN MAC-VPN case).
  (2) The VLAN ID if the MAC address is learned over a VLAN from the CE (set to 0 otherwise).
  (3) The Ethernet Segment Identifier (ESI).
  (4) The MAC address.
  (5) Optionally, one or more of the IP addresses associated with the learned MAC address.
  (6) The MAC-VPN MPLS label that is used by the MES to forward packets received from remote MESs. A MES may advertise the same MAC-VPN label for all MAC addresses in a given MAC-VPN instance (denoted as per-MVI label assignment) or a unique MAC-VPN label for each MAC address. Per-MVI label assignment requires the least number of MAC-VPN labels, but requires a MAC lookup in addition to a MPLS lookup on an egress MES for forwarding. Unique MAC address label assignment allows an egress MES to forward a packet (e.g., received from another MES to the connected CE) after performing only a MPLS label lookup (i.e., no MAC lookup).
  (7) One or more Route Target (RT) attributes, which may be configured (as in IP VPNs), or may be derived automatically from the VLAN ID associated with the advertisement. The route target (RT) attributes may be derived automatically from the VLAN ID associated with the advertisement by setting the Global Administrator field of the RT to an IP address of the MES. This IP address should be common for all the MAC-VPN instances on the MES, such as the loopback address of the MES. A different RT may be used for every VLAN in a MAC-VPN if the MAC-VPN contains multiple VLANs, while the RT for MAC-VPN including only one VLAN is derived from the VLAN for that MAC-VPN.
  (8) Optionally, the IP addresses associated with the MAC address, such as if the number of IP addresses is more than one and cannot be encoded in the NLRI.

Data Plane Impact of Label Allocation

Label allocation may be provided by, illustratively, per-Mac, per-ESI, or per-VMI. There are various tradeoffs to be considered, including the following tradeoffs. If label allocation is provided per-MAC, the result is a very high label count, egress forwarding with optional MAC lookup, and support of ETREE. If label allocation is provided per-ESI, the result is a medium label count, egress forwarding with optional MAC lookup, and support of ETREE. If label allocation is provided per-VMI, the result is a low label count, egress forwarding with required MAC lookup, and no support of ETREE.

Designated Forwarder (DF) Election for Multi-Homed CE

If a CE that is a host or a router is multi-homed directly to more than one MES in a MAC-VPN, only one of MESs is responsible for certain actions. Specifically, only one MES will send multicast, broadcast and unknown unicast traffic (i.e., traffic for which a MES does not know the destination MAC address) to the CE. A CE typically sends packets using a single link. If the CE is a host, then the host CE treats the multiple links used to reach the MESs as a Link Aggregation Group (LAG) or a bundle.

If a bridge network is multi-homed to more than one MES in a MAC-VPN via switches, only one of the MESs is responsible for certain actions. Specifically, only one MES in the multi-homed bridge network will (1) forward packets to other MESs outside of the multi-homed bridge network; (2) send multicast, broadcast and unknown unicast traffic to the bridge network.

The particular one MES is referred to as the designated forwarder (DF) MES for the Ethernet segment over which the CE is multi-homed to two or more MESs. This Ethernet segment may be a link bundle such as where the host or router is directly connected to the MESs, or a bridged LAN network such as where the CEs are switches.

The MESs perform a designated forwarder (DF) election using BGP for an Ethernet segment or combination of Ethernet segment and VLAN. In order to perform DF election, each MES advertises in BGP a Ethernet Tag auto-discovery route type using the MAC-VPN-NLRI for each Ethernet segment in a MAC-VPN.

Each Ethernet Tag auto-discovery NLRI typically contains the following information elements or fields:

(1) The Route-Distinguisher (RD) of the MAC-VPN instance that is advertising the NLRI.

(2) An Ethernet Segment Identifier.

(3) Optionally, a VLAN ID which may be set to 0.

(4) An upstream assigned MPLS label referred to as the "ESI label."

(5) A P-Tunnel attribute such as specified in VPLS-MCAST.

(6) One or more Route Target (RT) attributes.

The DF election for a particular ESI and VLAN combination proceeds by constructing a candidate list of MESs, and choosing a DF from the candidate list.

The candidate list is constructed at a MES or NMS and includes all the routes with the particular {ESI, VLAN} tuple that a MES imports in a MAC-VPN instance, including the route generated by the MES itself, if any.

The DF MES is then selected or elected from this candidate list by those MESs that import the Ethernet tag auto-discovery route type. In one embodiment, the selected DF is the MES with the highest IP address of all the MESs in the candidate list. In this manner, each MES will choose the same DF MES for a given ESI and VLAN combination (except during routing transients).

BGP MAC VPN Issues

The above described mechanisms are improved to address various challenges associated with BGP MAC-VPN related to (1) packet duplication, where a remote CE receives two copies of the same packet; (2) loop prevention, where a packet originated by CE1 is returned to CE1 (e.g., permanent loops and/or transitory loops, no TTL in the ETH packet, etc.); and (3) MAC table instability, where a MAC table M1 appears alternatively at destination CE2 on different links (such that it needs to be moved frequently between links, thereby creating re-ordering issues and MAC table instability).

In one embodiment, the MAC table instability issue is addressed by a BGP MAC VPN mechanism in which a Link Aggregation Group (LAG) is used at the CE so that the same MAC appearing on multiple links does not create MAC moves/MAC table instability. In this embodiment, MAC learning at the CE is turned off and replaced with a CE←PE MAC protocol. This approach is a modified version of the approach described in IEEE 802.1aq specification.

Figure 2:
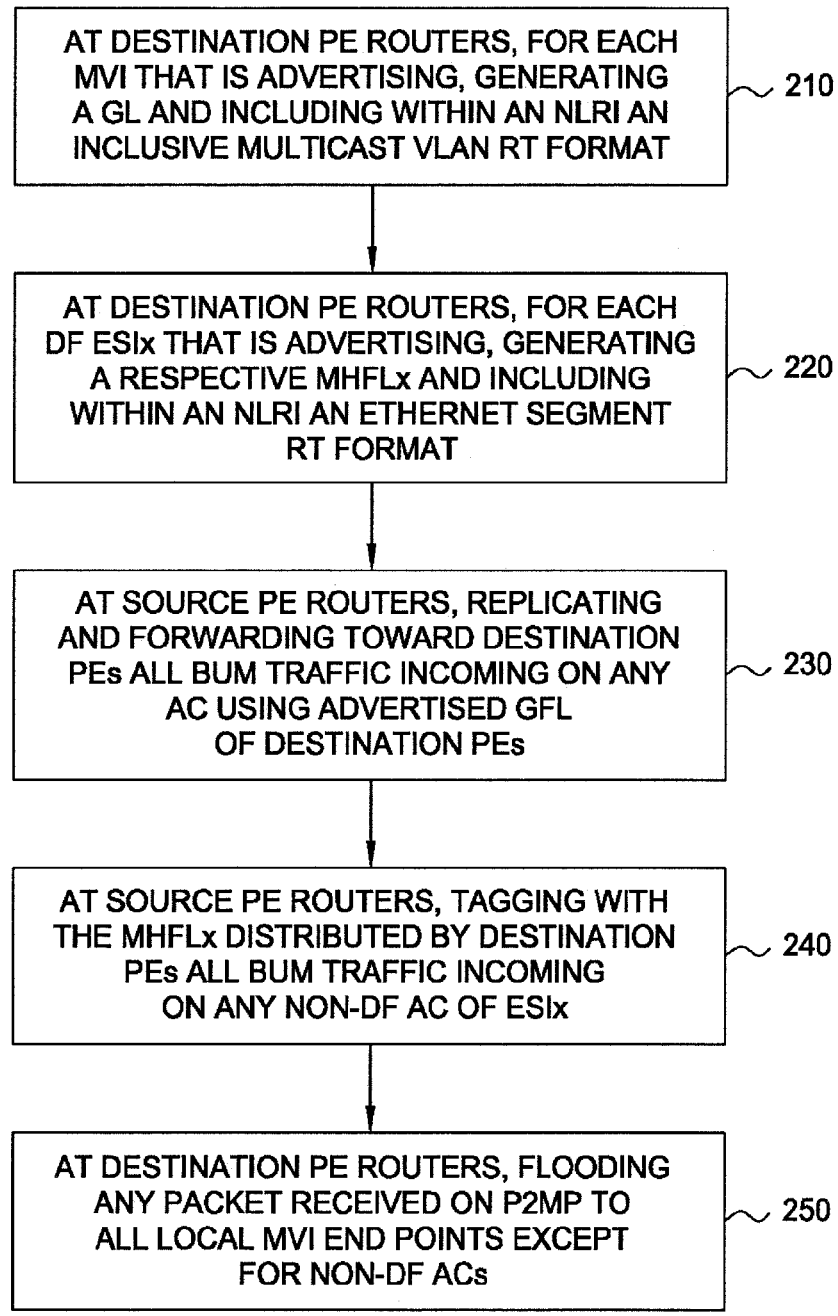
FIG. 2 depicts a flow diagram of a downstream label allocation method according to one embodiment.
Figure 3:
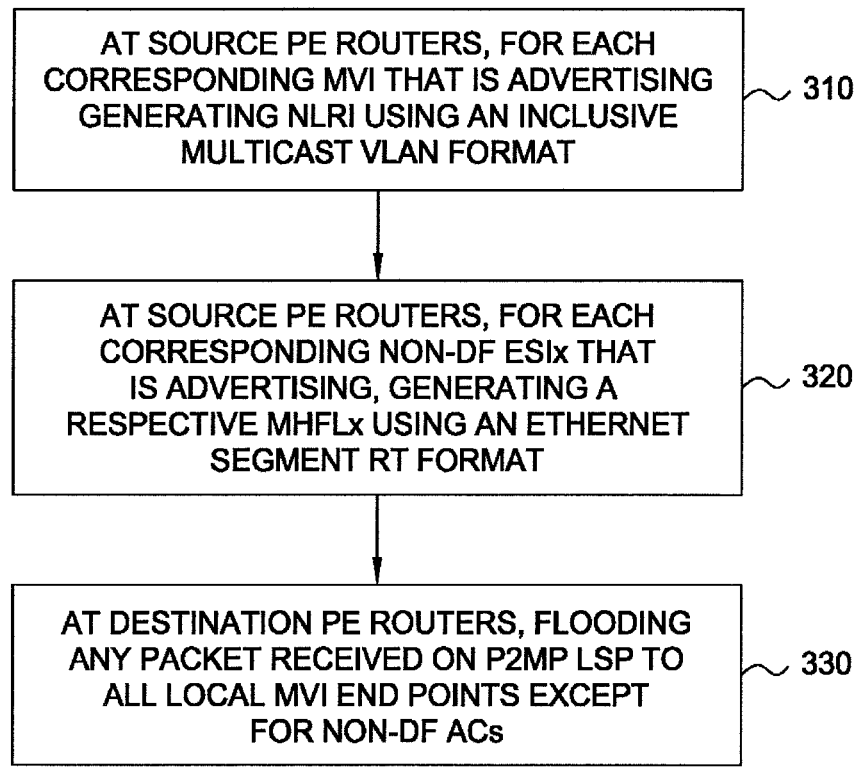
FIG. 3 depicts a flow diagram of an upstream label allocation method according to one embodiment.

A generic flooding label is generated by each destination PE routers for each flooding domain and distributed using downstream label allocation (FIG. 2), or by source PE routers and distributed using upstream label allocation (FIG. 3). Source PE routers responsively route packets according to their destination MAC address (if known) adding the associated unicast label for the MAC address. If the MAC address is unknown or if it is a group MAC (Multicast/Broadcast) the appropriate flooding label(s) are added to the packet to indicate the packet was flooded at the source in the BGP MAC VPN context. An additional point to point tunnel label (downstream label allocation case) or a point to multi-point tunnel label (upstream label allocation case) may be added to the packet to transport it through the MPLS network 110.

FIG. 2 depicts a flow diagram of a downstream label allocation method according to one embodiment. Specifically, FIG. 2 depicts a flooding label distribution method 200 suitable for distributing flooding labels in a BGP MAC VPN providing point to point (P2P) label switched paths (LSPs).

One flooding label is provided for each flooding domain in a MAC-VPN Instance (MVI) and one for each Ethernet Segment Identifier (ESI) associated with a Multi-Homing CE. The generated flooding labels are advertised to the other PEs using the previously described BGP Network Layer Reachability Information (NLRI) denoted as MAC-VPN-NLRI.

At step 210, at destination provider edge (PE) routers, for each MVI that is advertising using NLRI, the corresponding PE router generates a Generic Flooding Label (GFL) and includes within the NLRI the Inclusive Multicast VLAN RT format: Route-Distinguisher (RD) of the MVI, an ESI, an Ethernet tag, and the Originating Router's IP Address. That is, NLRI: RD+ESI+Ethernet tag+Router IP. The GFL is included in the P-Tunnel attribute where the tunnel type is point-to-point.

At step 220, at destination PE routers, for each DF ESI that is advertised using NLRI, the corresponding PE router also generates a respective Multi-Homing Flooding Label (MHFL) and includes within the NLRI the Ethernet Segment RT format: Route-Distinguisher (RD), the specific ESIx, the corresponding MHFLx and the Originating Router's IP Address. That is, NLRI: RD+ESIx+MHFLx+PE IP.

At step 230, at source provider equipment (PE) routers, all broadcast/unknown unicast/multicast (BUM) traffic incoming on any attachment circuit (AC) is replicated and sent then towards all the destination PEs that are MAC VPN members using the GFL advertised by each destination PE.

At step 240, at source provider equipment (PE) routers, in addition to the GFL, BUM traffic entering on a Non-DF AC of ESIx is tagged with the MHFLx distributed by the destination PE with the corresponding ESIx. That is, the Multi-Homing Flooding Label associated with a particular ESI is kept only for BUM traffic originated at the Non-DF AC associated with the particular ESI.

At step 250, at destination PE routers, any packet received on the P2MP LSP is flooded to all the local MVI endpoints except for the non-DF ACs. When the MHFLx is present, the packet is also not sent on the DF AC for ESIx.

FIG. 3 depicts a flow diagram of an upstream label allocation method according to one embodiment. Specifically, FIG. 3 depicts a flooding label distribution method 300 suitable for distributing flooding labels in a BGP MAC-VPN using point to multi-point (P2MP) label switched paths (LSPs).

A P2MP LSP label is provided for each MAC-VPN Instance (MVI) and a flooding label is provided for each non-designated forwarder (non-DF) on an Ethernet Segment Identifier (ESI). The generated labels are propagated or advertised to the other PEs using the previously described Network Layer Reachability Information (NLRI) denoted as MAC-VPN-NLRI.

At step 310, at source provider edge (PE) routers, for each MVI that is advertising using NLRI, the corresponding PE generates the NLRI using the Inclusive Multicast VLAN RT format: Route-Distinguisher (RD) of the MVI, an ESI, an Ethernet tag and the Originating Router's IP Address. That is, NLRI: RD+ESI+Ethernet tag+Router IP along with the P-Tunnel (PMSI Tunnel) attribute with tunnel type of P2MP. There is no GFL used for any BUM traffic incoming on ACs since the label associated with the P2MP LSP already indicates that the traffic was flooded at the source PE.

At step 320, at source PE routers, for each non-DF ESI that is advertising using NLRI, the corresponding PE also generates a respective MHFL and includes within the NLRI the Ethernet Segment RT format: Route-Distinguisher (RD), the specific ESIx, the corresponding MHFLx and the Originating Router's IP Address along with a P-tunnel attribute. That is, NLRI: RD+ESIx+MHFLx+PE IP, along with the P-Tunnel attribute. The MHFLx is used for any BUM traffic incoming on the non-DF AC for ESIx in addition to the P2MP LSP label.

At step 330, at destination PE routers, any packet received on the P2MP LSP is flooded to all the local MVI endpoints except for the non-DF ACs. When the MHFLx is present the packet is also not sent on the DF AC for ESIx.

The methodologies of FIGS. 2-3 contemplate the distribution and use of a Generic flooding Label (GFL) and a Multi-Homing Flooding Label (MHFLx).

In this manner, a loopback avoidance mechanism is provided to prevent traffic originating from a Non-DFx AC on a source PE to be forwarded back to a CEx via the DFx. The mechanism also prevents packet duplication when the same packet flooded to both DFx and Non-DFx endpoints is forwarded towards CEx.

For example, it can be seen in FIG. 1 that both CE-2 and CE-3 are multi-homed to MES-1 and MES-2, with MES-2 selected as the DF. Traffic flow from CE-2 or CE-3 to MES-1 will be dropped by MES-1, while traffic flow from CE-2 or CE-3 to MES-2 will either be forwarded by MES-2 to the correct destination MES (destination MAC address known to MES-2) or flooded to the other MESs (destination MAC address unknown to MES-2) as described herein. In this manner, traffic is not unnecessarily flooded back toward a source of the traffic.

The above described methods and techniques provide a BGP MAC VPN solution adapted to prevent loops and packet duplication using a third MPLS label in the packet or second MPLS label for P2MP LSP/MP2MP LSPs if no aggregate tree is used, either GFL and MHFLx.

Generally speaking, in the case of BUM traffic, a third label is added in the packet. If an aggregate tree is not used then a second label is used for P2MP LSP/MP2MP LSPs (either GFL or MHFLx label). At the source MES, the BUM traffic is tagged using (upstream/downstream) Generic Flooding Label (GFL), GFL=0 (implicit NULL label). In various embodiments, the GFL label is the same on all MES(s), for local flooding the packet is sent to all local AC(s), which are SH and DF MH AC(s), and at a remote MES the flood traffic is tagged with a GFL only to SH & DF ACs.

Computer Hardware/Software Implementation

Figure 4:
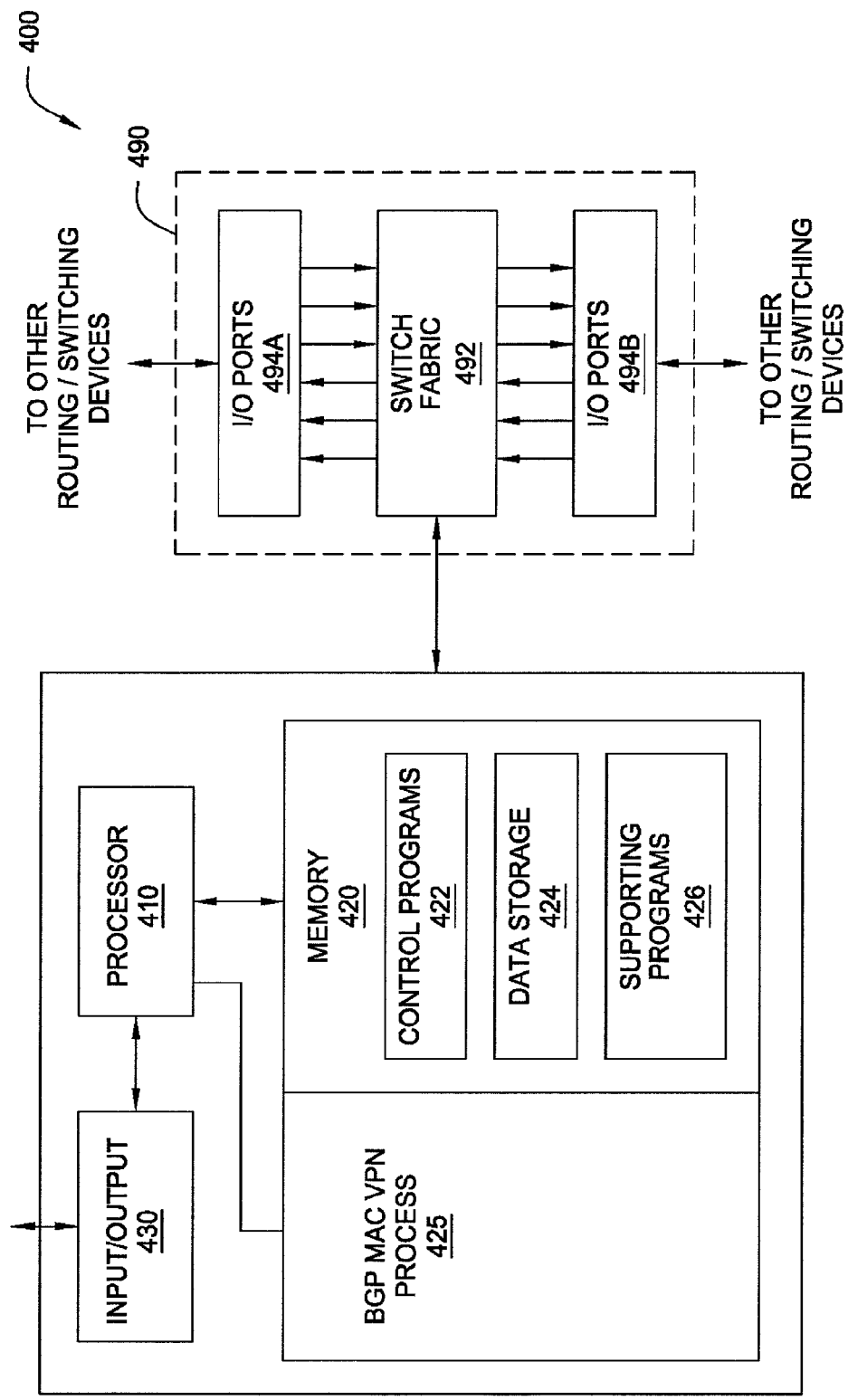
FIG. 4 depicts a computer architecture and optional switching mechanism suitable for use in the various embodiments described herein.

FIG. 4 depicts a computer architecture and optional switching mechanism suitable for use in the various embodiments described herein. The computer architecture may be adapted to implement the specific functions described herein including label generation, label distribution, packet routing, datagram routing, traffic routing, control plane processing functions, data plane processing functions and so on.

The computer architecture comprises, illustratively, a processor element 410 (e.g., a central processing unit (CPU) and/or other suitable processor(s)), a memory 420 (e.g., random access memory (RAM), read only memory (ROM), and the like), a BGP MAC-VPN module/process 425 (which may be included within the memory 420) and various input/output devices 430.

The memory 420 is depicted as including control programs 422, data storage 424 and supporting programs 426. These various programs and data storage portions of the memory 420 may be used to store programs for executing the methodologies described herein, programs for supporting the various methodologies, databases, router tables and other data structures supporting the various methodologies, reporting functions/programs and so on.

The various input/output devices 430 may include user input devices such as a keyboard, a keypad, a mouse, and the like; user output device such as a display, a speaker, and the like; input communications port(s), output communications port(s); a receiver/transmitter (e.g., network connection or other suitable type of receiver/transmitter); a storage devices (e.g., a hard disk drive, a compact disk drive, an optical disk drive, and the like).

Optional switching mechanism 490 includes a switching fabric 492 and ingress/egress ports 494. Specifically, the optional switching mechanism 490 is depicted as communicating with a first group of other routing/switching devices via a first plurality of input/output ports 494A, and communicating with a second group of other routing/switching devices via a second plurality of input/output ports 494B. The optional switching mechanism 490 is depicted in a relatively generic configuration. Other configurations associated with the optional switching mechanism 490 will be readily understood by those skilled in the art and are contemplated by the inventors as useful within the context of the present embodiments.

In one embodiment, computer software code associated with methods for invoking the various embodiments can be loaded into the memory and executed by the processor to implement the functions as discussed herein above. In one embodiment, the computer software code associated with methods for invoking the various embodiments can be stored on a computer readable storage medium, e.g., RAM memory, magnetic or optical drive or diskette, and the like. The computer is suitable for use as any of the network elements depicted and described herein, including but not limited to customer edge (CE) routers, provider edge (PE) routers, MPLS Edge Switches (MESs), and other network elements depicted and described herein.

It is contemplated that functions depicted and described herein may be implemented in software and/or in a combination of software and hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a tangible or intangible broadcast or other signal bearing medium, and/or stored within a memory within a computing device operating according to the instructions.

Although primarily depicted and described herein with respect to embodiments in the BGP MAC-VPN capability is used in conjunction with specific protocols, the principles of the BGP MAC-VPN capability may be adapted for use with any other suitable protocol(s).

Although primarily depicted and described herein with respect to embodiments in the BGP MAC-VPN capability is used in conjunction with a specific type of network (illustratively, an IP/MPLS network), the principles of the BGP MAC-VPN capability may be adapted for use with any other suitable network(s).

Generally speaking, computer hardware, software and/or firmware of the general architecture discussed herein may be replicated and used at each of a plurality of nodes or network elements or network management elements associated with a network. Moreover, such computer hardware, software and/or firmware at various locations, nodes, network elements or network management system elements may be operably communicating with each other to achieve the various steps, protocols, interactions and so on contemplated herein.

Figure 5:
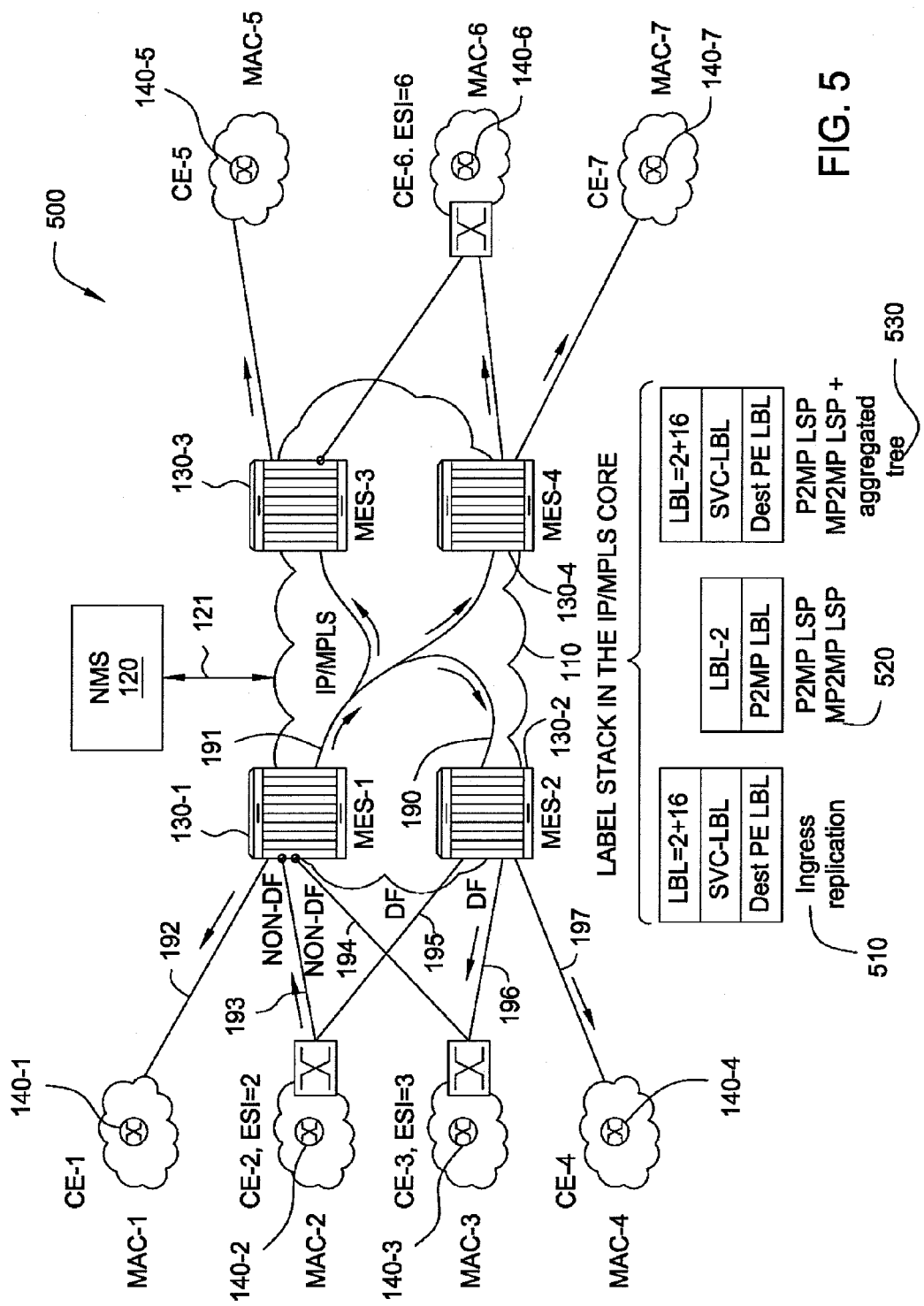
FIG. 5-7 depict high-level block diagrams of a communication network architecture operating according to various embodiments.
Figure 6:
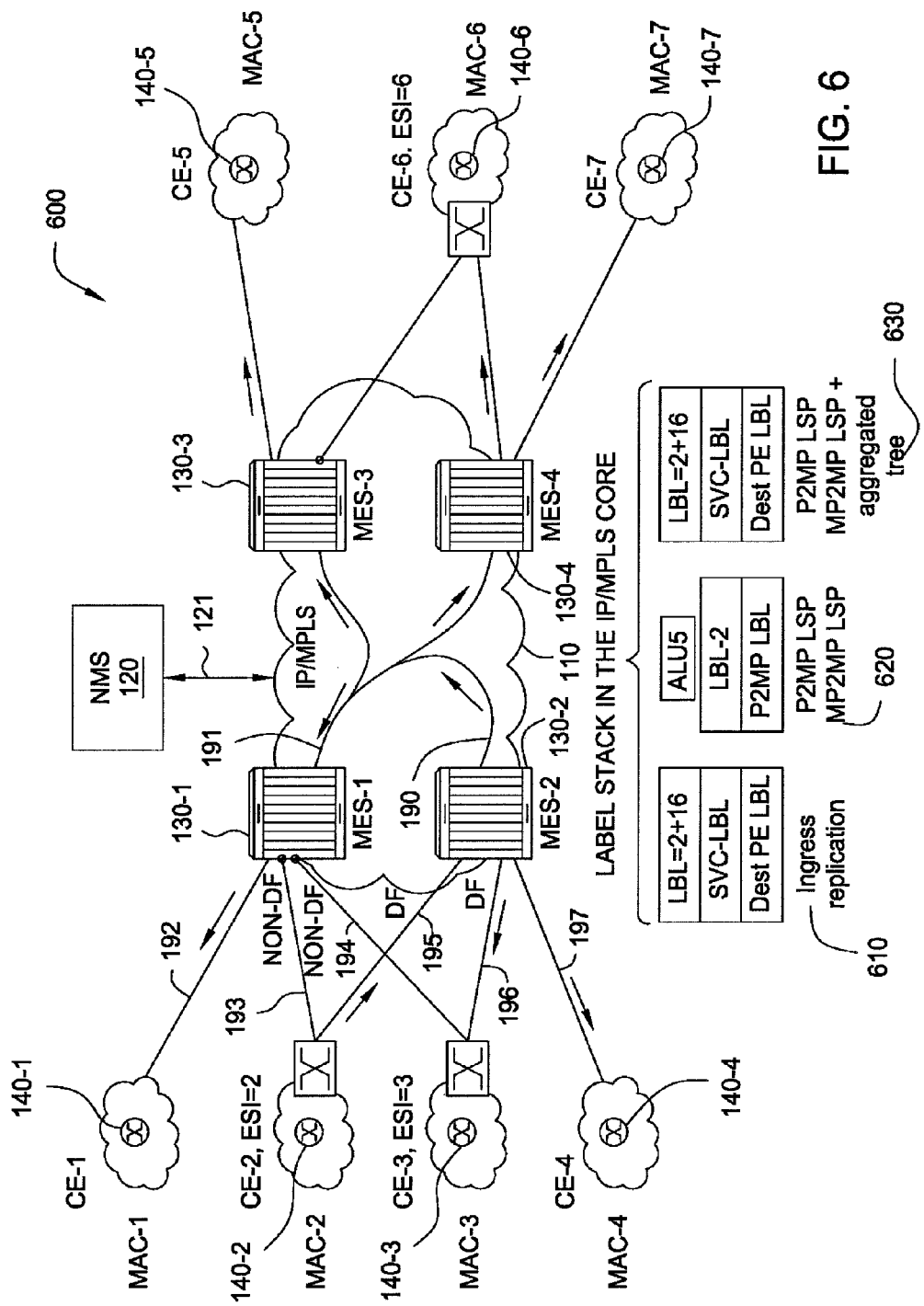
Figure 7:
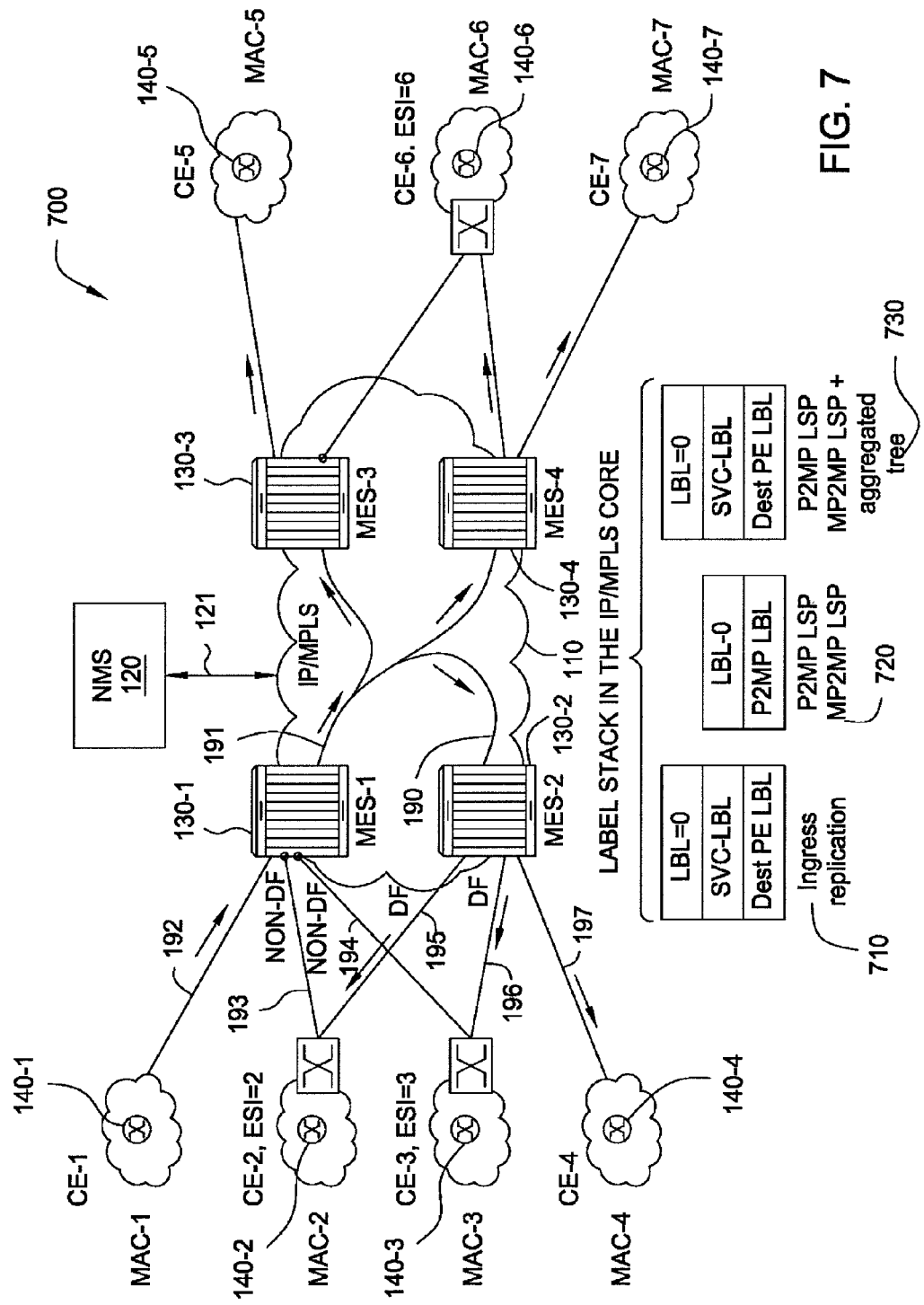

FIG. 5-7 depict high-level block diagrams of a communication network architecture operating according to various embodiments. Specifically, FIGS. 5-7 depict the architecture of FIG. 1 with traffic flow indication arrows along the referenced paths 190-197 indicative of flooding behaviors in accordance with various embodiments.

FIG. 5 illustrates an example of PE router flooding behavior responsive to the reception of BUM traffic at a non-DF MH PE router. Specifically, CE-2 forwards BUM traffic to MES-1 via path 193. MES-1 is a non-DF PE router with respect to CE-2.

MES-1, which is a non-DF MH router with respect to CE-2, responsively floods the BUM traffic to all other MEs 130 via path 191 and to any CE to which ME-1 is a DF MH router (CE-1 via path 192 in this example). Note that BUM traffic is not flooded from MES-1 to CE-3 via path 194, since ME-1 is not a DF router with respect to CE-3.

MES-2, which receives the flooded BUM traffic from MES-1 via path 190, responsively floods the BUM traffic to all of its homed or local CEs except the local CE with the same ESI as the BUM traffic; namely, CE-2. in this manner, the BUM traffic originated at CE-2 is not flooded or otherwise routed back to CE-2.

Also depicted in FIG. 5 are the various labels associated with the traffic passing through the IP/MPLS core 110 under the control of NMS 120. The stacked labels include three labels associated with the ingress replication stack 510 (where the third label is denoted as LBL=2+16), two labels associated with the P2MP LSP/MP2MP LSP 520, and three labels associated with the P2MP LSP/MP2MP LSP+aggregated tree 530 (where the third label is denoted as LBL=2+16).

FIG. 6 illustrates an example of PE router flooding behavior responsive to the reception of BUM traffic at a DF MH PE router. Specifically, CE-2 forwards BUM traffic to MES-2 via path 195. MES-2 is a DF PE router with respect to CE-2.

MES-2, which is a DF MH router with respect to CE-2, responsively floods the BUM traffic to all other MEs 130 via path 190, and to any CE to which ME-3 is a DF MH router (CE-3 via path 196 and CE-4 via path 197 in this example). Note that BUM traffic is not flooded from MES-2 back to CE-2 via path 195, MES-1, which receives the flooded BUM traffic from MES-2 via path 191, responsively floods the BUM traffic to all of its DF homed local CEs; namely, CE-1. MES-1 does not forward the BUM traffic to any connected non-DF CEs, such as CE-2 and CE-3 in this example. In this manner, the BUM traffic originated at CE-2 is not flooded or otherwise routed back to CE-2.

Also depicted in FIG. 6 are the various labels associated with the traffic passing through the IP/MPLS core 110 under the control of NMS 120. The stacked labels include three labels associated with the ingress replication stack 610 (where the third label is denoted as LBL=2+16), two labels associated with the P2MP LSP/MP2MP LSP 620, and three labels associated with the P2MP LSP/MP2MP LSP+aggregated tree 630 (where the third label is denoted as LBL=2+16). It is noted that a third entity denoted as ALU5 is associated with the P2MP LSP/MP2MP LSP stack 620 due to the processing of BUM traffic by a DF MH site.

FIG. 7 illustrates an example of PE router flooding behavior responsive to the reception of BUM traffic received at a SH MH PE router. Specifically, CE-1 forwards BUM traffic to MES-1 via path 192. MES-1 is a DF PE router with respect to CE-1.

MES-1, which is a DF MH router with respect to CE-1, responsively floods the BUM traffic to all other MEs 130 via path 191, and to any CE to which ME-1 is a DF MH router (none in this example). Note that BUM traffic is not flooded from MES-1 back to CE-1 via path 192.

MES-2, which receives the flooded BUM traffic from MES-1 via path 190, responsively floods the BUM traffic to all of its SH and MH CEs; namely, CE-2, CE-3 and CE-4. In this manner, the BUM traffic originated at CE-1 is not flooded or otherwise routed back to CE-1.

Also depicted in FIG. 7 are the various labels associated with the traffic passing through the IP/MPLS core 110 under the control of NMS 120. The stacked labels include three labels associated with the ingress replication stack 710 (where the third label is denoted as LBL=0), two labels associated with the P2MP LSP/MP2MP LSP 720, and three labels associated with the P2MP LSP/MP2MP LSP+aggregated tree 730 (where the third label is denoted as LBL=0).

Although various embodiments which incorporate the teachings of the present invention have been shown and described in detail herein, those skilled in the art can readily devise many other varied embodiments that still incorporate these teachings.

What is claimed is:

1. A method for distributing flooding labels within a Multiprotocol Label Switching (MPLS) infrastructure supporting Border Gateway Protocol (BGP) Media Access Control (MAC) Virtual Private Networking (VPN), the method comprising:

at a source provider edge (PE) router:

for a MAC-VPN Instance (MVI) that is advertising using first network layer reachability information (NLRI), generating the first NLRI for the MVI using an inclusive multicast Virtual Local Area Network Route-Type (VLAN RT) format, wherein the inclusive multicast VLAN RT format comprises a Route-Distinguisher (RD) of the MVI, an Ethernet Segment Identifier (ESI), an Ethernet tag, and an originating router Internet Protocol (IP) address;

for a non designated forwarder (non-DF) ESI that is advertised using second NLRI, generating a respective Multi-Homing Flooding Label (MHFL) and generating the second NLRI for the non-DF ESI using an Ethernet Segment Route-Type (RT) format, wherein the Ethernet Segment RT format comprises an RD, the non-DF ESI, the respective MHFL, and an originating router IP address;

replicating, and forwarding toward a destination PE router, broadcast/unknown unicast/multicast (BUM) traffic received via any attachment circuit (AC) according to a corresponding generic flooding label (GFL) distributed by the destination PE router; and tagging BUM traffic entering on a non-DF AC of an ESI with a corresponding MHFL distributed by the destination PE router.

2. The method of claim 1, further comprising:
propagating the first NLRI for the MVI toward at least one other PE router.

3. The method of claim 1, further comprising:
propagating the second NLRI for the non-DF ESI toward at least one other PE router.

4. The method of claim 1, wherein the Ethernet Segment RT format further comprises a P-tunnel attribute.

5. A source provider edge (PE) router for distributing flooding labels within a Multiprotocol Label Switching (MPLS) infrastructure supporting Border Gateway Protocol (BGP) Media Access Control (MAC) Virtual Private Networking (VPN), the source PE router comprising:
a processor and a memory communicatively connected to the processor, the processor configured to:
for a MAC-VPN Instance (MVI) that is advertising using first network layer reachability information (NLRI), generate the first NLRI for the MVI using an inclusive multicast Virtual Local Area Network Route-Type (VLAN RT) format, wherein the inclusive multicast VLAN RT format comprises a Route-Distinguisher (RD) of the MVI, an Ethernet Segment Identifier (ESI), an Ethernet tag, and an originating router Internet Protocol (IP) address;
for a non designated forwarder (non-DF) ESI that is advertised using second NLRI, generate a respective Multi-Homing Flooding Label (MHFL) and generating the second NLRI for the non-DF ESI using an Ethernet Segment Route-Type (RT) format, wherein the Ethernet Segment RT format comprises an RD, the non-DF ESI, the respective MHFL, and an originating router IP address;
replicate, and forward toward a destination PE router, broadcast/unknown unicast/multicast (BUM) traffic received via any attachment circuit (AC) according to a corresponding generic flooding label (GFL) distributed by the destination PE router; and
tag BUM traffic entering on a non-DF AC of an ESI with a corresponding MHFL distributed by the destination PE router.

6. The source PE router of claim 5, the processor configured to:
propagate the first NLRI for the MVI toward at least one other PE router.

7. The source PE router of claim 5, the processor configured to:
propagate the second NLRI for the non-DF ESI toward at least one other PE router.

8. The source PE router of claim 5, wherein the Ethernet Segment RT format further comprises a P-tunnel attribute.

9. A non-transitory computer-readable storage medium storing instructions which, when executed by a computer, cause the computer to perform a method for distributing flooding labels within a Multiprotocol Label Switching (MPLS) infrastructure supporting Border Gateway Protocol (BGP) Media Access Control (MAC) Virtual Private Networking (VPN), the method comprising:
at a source provider edge (PE) router:
for a MAC-VPN Instance (MVI) that is advertising using first network layer reachability information (NLRI), generating the first NLRI for the MVI using an inclusive multicast Virtual Local Area Network Route-Type (VLAN RT) format, wherein the inclusive multicast VLAN RT format comprises a Route-Distinguisher (RD) of the MVI, an Ethernet Segment Identifier (ESI), an Ethernet tag, and an originating router Internet Protocol (IP) address;
for a non designated forwarder (non-DF) ESI that is advertised using second NLRI, generating a respective Multi-Homing Flooding Label (MHFL) and generating the second NLRI for the non-DF ESI using an Ethernet Segment Route-Type (RT) format, wherein the Ethernet Segment RT format comprises an RD, the non-DF ESI, the respective MHFL, and an originating router IP address;
replicating, and forwarding toward a destination PE router, broadcast/unknown unicast/multicast (BUM) traffic received via any attachment circuit (AC) according to a corresponding generic flooding label (GFL) distributed by the destination PE router; and
tagging BUM traffic entering on a non-DF AC of an ESI with a corresponding MHFL distributed by the destination PE router.

10. The non-transitory computer-readable storage medium of claim 9, the method further comprising:
propagating the first NLRI for the MVI toward at least one other PE router.

11. The non-transitory computer-readable storage medium of claim 9, the method further comprising:
propagating the second NLRI for the non-DF ESI toward at least one other PE router.

12. The non-transitory computer-readable storage medium of claim 9, wherein the Ethernet Segment RT format further comprises a P-tunnel attribute.

* * * * *